(No Model.)
H. L. BRADLEY.
SHELF BRACKET.
No. 485,857. Patented Nov. 8, 1892.
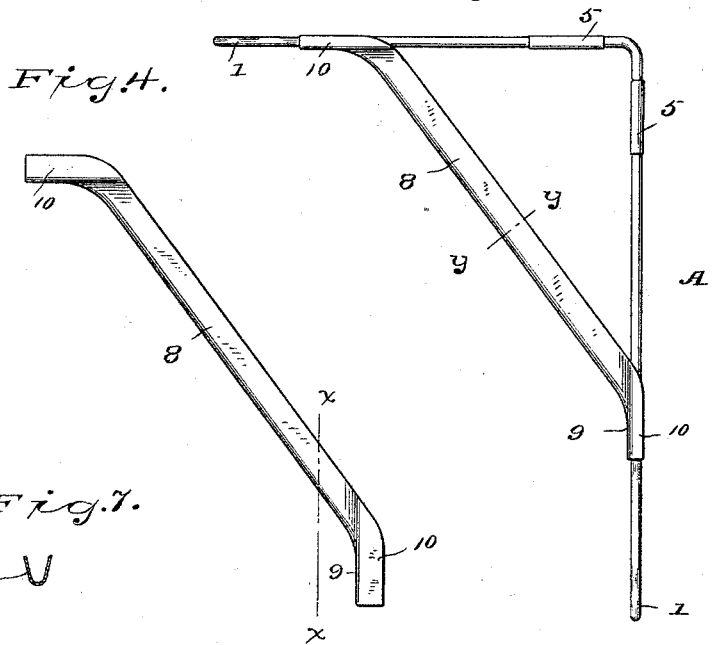
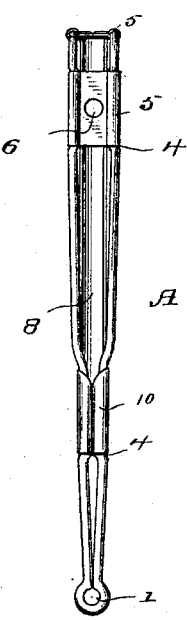
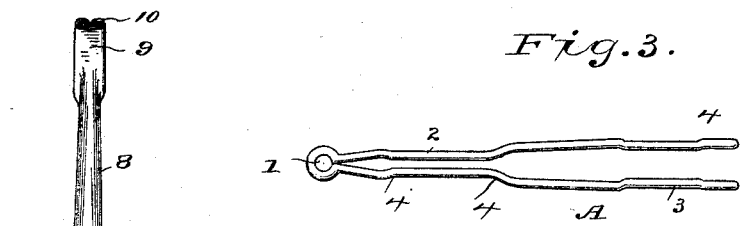
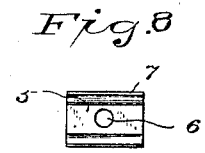
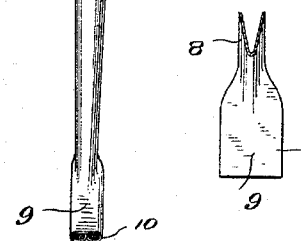
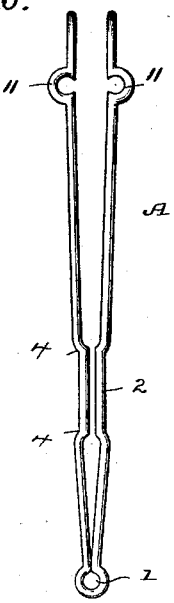
WITNESSES
H. A. Lamb
Mattie R. Davis
INVENTOR
Henry L. Bradley
By H. M. Wooster, atty.

UNITED STATES PATENT OFFICE.

HENRY L. BRADLEY, OF NEW HAVEN, CONNECTICUT.

SHELF-BRACKET.

SPECIFICATION forming part of Letters Patent No. 485,857, dated November 8, 1892.

Application filed May 26, 1892. Serial No. 434,381. (No model.)

*To all whom it may concern:*

Be it known that I, HENRY L. BRADLEY, a citizen of the United States, residing at New Haven, in the county of New Haven and State of Connecticut, have invented certain new and useful Improvements in Shelf-Brackets; and I do hereby declare the following to be a full, clear, and exact description of the invention, such as will enable others skilled in the art to which it appertains to make and use the same.

My invention has for its object to simplify, strengthen, and to otherwise improve the construction and operation of shelf-brackets. With these ends in view I have devised the simple and novel construction which I will now describe, referring by numbers to the accompanying drawings, forming part of this specification, in which—

Figure 1 is a side elevation of my novel bracket complete; Fig. 2, a rear elevation; Fig. 3, a plan view of the bracket before the brace and clips are applied; Fig. 4, a side elevation of the brace detached; Fig. 5, a front elevation showing the special form of the brace and the manner in which it is attached in place; Fig. 6, a section of the brace on the line $x\ x$ in Fig. 4; Fig. 7, a cross-section of the brace on the line $y\ y$ in Fig. 1. Figs. 8 and 9 are respectively a plan view and end view of one of the clips before it is closed upon the bracket, and Fig. 10 is a rear elevation of a form in which clips are dispensed with.

A denotes the bracket, which is formed from a single piece of wire, which is curved to form eyes at the ends of the two arms of the bracket, and reduced portions 2, to receive the ends of the brace, and reduced portions 3, to receive the clips near the ends of the arms of the bracket. The wire from which the bracket is formed is curved outward at the ends of the reduced portions, to form shoulders 4, against which the ends of the brace and clips rest when assembled, whereby said parts are held rigidly in place and the article as a whole is braced and greatly strengthened and its general attractiveness of appearance improved.

5 denotes clips, which are made of sheet metal and are provided with screw-holes 6, and the ends 7, which are closed about the reduced portions 3 of the bracket, thereby locking the clips firmly in place. The ends of the clips rest against the shoulders, which prevent the possibility of the clips sliding in use and improves the appearance of the bracket as a whole by avoiding an enlargement where the clips are put on.

8 denotes the brace, which is blanked out from sheet metal and formed to the shape illustrated in Fig. 4. The brace is made U shape in cross-section and is provided at each end with a head 9, formed from the same piece of metal. These heads are set at an angle to the body of the brace and are provided with side flanges 10, which are adapted to be curved about the arms of the bracket, as clearly shown in Figs. 1 and 2, the ends of the head resting against the shoulders, so as to cause the entire thrust of the brace to be taken up by the bracket itself, the bracket and brace being thus held against the possibility of movement independently of each other. It will be noticed, furthermore, that the body portion of the brace starts from the central portion of the head, which gives the greatest possible strength to this portion of the brace, and also gives it a finished and ornamental appearance when in place upon a bracket. In order to give to the brace the greatest possible strength to resist compression and at the same time render it unnecessary to use heavy metal, I curve the sides of the brace outward from near the heads toward the center, the width of the brace being perceptibly greatest at the center, as is clearly shown in Figs. 5 and 7. This gives to the brace the greatest possible strength to resist compression and renders collapsing absolutely impossible under any reasonable amount of pressure. In practice I find that brackets constructed in this manner weigh less than half as much as cast-iron brackets of the same size and will carry very much more weight without danger of breaking down. Furthermore, the number of screws required to hold them in place is reduced, thus lessening both the cost and the labor of putting them up, and as the screws are placed higher up than is possible in cast-metal brackets the hold upon the wall is greatly strengthened.

In Fig. 10 I have illustrated a form in which the clips are dispensed with, and loops 11 are formed for the screws from the piece of wire from which the arms of the bracket are formed. This form is inexpensive and gives a wide bearing on the wall.

Having thus described my invention, I claim—

1. A bracket the body of which is formed from a single piece of wire which is curved to form eyes at the outer ends of the arms and is also curved inward to form reduced portions and shoulders for the engagement of the brace.

2. The combination, with a bracket made from a single piece of wire, which is curved to form eyes at the ends of the arms and is curved inward to form reduced portions and shoulders, of clips adapted to engage certain of the reduced portions and a brace having heads provided with side flanges adapted to be curved about certain other of the reduced portions, the ends of the heads resting against the shoulders, so that the brace and bracket are locked against movement independently of each other and the width is not increased where the clips and braces are attached.

In testimony whereof I affix my signature in presence of two witnesses.

HENRY L. BRADLEY.

Witnesses:
GEORGE C. LEES,
GEORGE A. KELLOGG.